LE ROY A. BIGGAR AND RUTHERFORD H. BIGGAR.
AUTOMOBILE SIGNAL.
APPLICATION FILED NOV. 2, 1920.
1,400,136.
Patented Dec. 13, 1921.
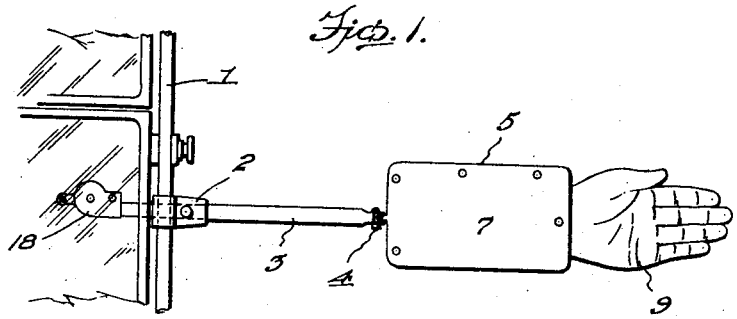
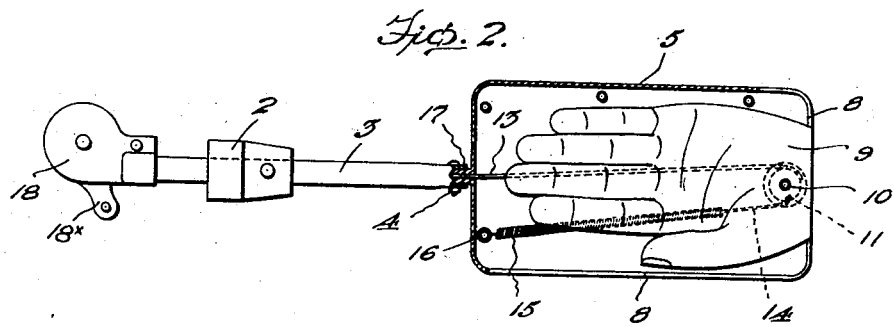
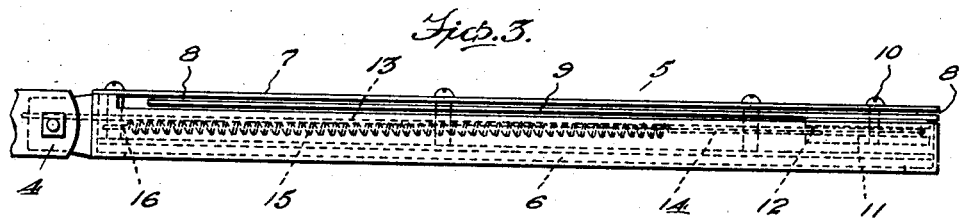
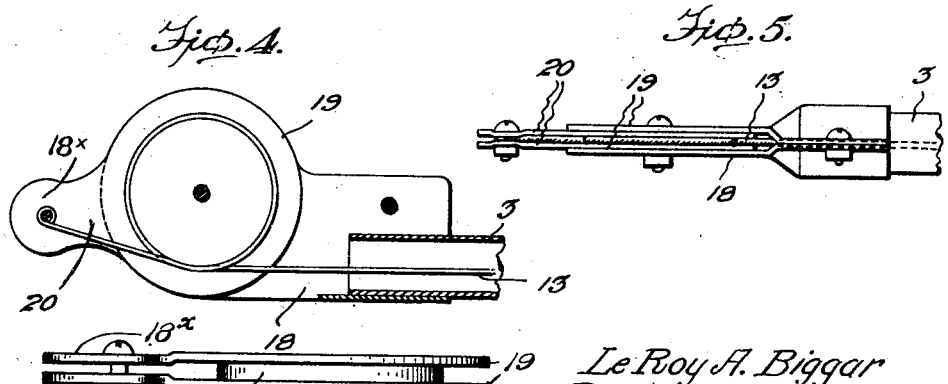
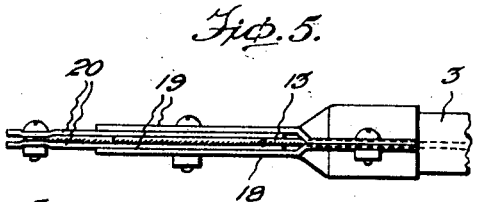

UNITED STATES PATENT OFFICE.

LEROY AYRES BIGGAR AND RUTHERFORD HAYES BIGGAR, OF ONEIDA, NEW YORK.

AUTOMOBILE-SIGNAL.

1,400,136.  Specification of Letters Patent.  Patented Dec. 13, 1921.

Application filed November 2, 1920. Serial No. 421,326.

*To all whom it may concern:*

Be it known that we, LEROY A. BIGGAR and RUTHERFORD H. BIGGAR, citizens of the United States, residing at Oneida, in the county of Madison and State of New York, have invented new and useful Improvements in Automobile-Signals, of which the following is a specification.

The object of our present joint invention is the provision of a simple, compact and reliably-operating automobile signal of the type characterized by a casing having by preference a mirror at its rear side, and adapted to be supported to the left of an automobile wind-shield, and a signal member movable out of and back into the said casing.

To the attainment of the foregoing, the invention consists in the improvement as hereinafter described and definitely claimed.

In the accompanying drawings, hereby made a part hereof:

Figure 1 is a view illustrative of the application and general arrangement of our novel signal.

Fig. 2 is a longitudinal vertical section taken through the signal *per se.*

Fig. 3 is a detail view illustrative of the casing body and the arrangement of the cable and the retractile spring in the casing body and relatively to the pulley that is fixed with respect to the swinging signal member.

Figs. 4 and 5 are detail views illustrative of the arrangement of the cable relatively to the actuating hand lever.

Fig. 6 is a detail view illustrative of the pulley 11 and the lever portion 20 and the cable.

Similar numerals of reference designate corresponding parts in all of the views of the drawings.

At 1 is the frame of an automobile wind-shield, and at 2 is a bracket fixed to the left-hand upright of the said frame.

Clamped or otherwise suitably secured at an intermediate point of its length in the said bracket 2, is the tubular body 3 of our novel signal.

Hinged at 4 to the outer end of the said tubular body 3 and arranged to be adjusted horizontally on the body is the casing body 5 of the signal. The said casing body 5 is preferably, though not necessarily, provided at its rear side with a mirror 6, to enable the driver to see behind. The said casing body 5 is equipped with a removable cover plate 7, and is also provided in its lower and outer end wall with an opening 8 through which is designed to be moved the signal member 9. The said signal member 9 is pivoted at 10 in the casing body, and is preferably, though not necessarily, shaped and embellished to simulate a human hand. Fixed with respect to the said swinging signal member 9 and mounted to turn therewith is a circumferentially-grooved pulley 11. The said pulley 11 is disposed between the signal member and the opposed wall of the casing body 5, and is provided with a reduced portion 12 arranged adjacent to the side of the signal member. Connected to and designed to be wound on the said pulley portion 12 is a cable 13, and connected to and designed to be wound on the circumferentially grooved portion of the pulley is the outer terminal 14 of a retractile spring 15, the inner end of which is connected at 16 to the inner end portion of the casing body. The cable 13 is carried through an aperture 17 in the inner end wall of the casing body, and also through the members of the hinge 4, and is extended longitudinally through the tubular body 3 to the inner end thereof. Mounted on the inner end of the tubular body 3 is a casing 18, and in the said casing is mounted an actuating lever $18^x$. The said actuating lever includes two disk-like sections 19 and a circular portion 20 of comparatively small diameter arranged between and fixed to the said sections 19. The cable 13 is looped around the intermediate circular portion 20 of the actuating lever Fig. 4, and is connected to said lever at a point outwardly beyond the portions 19. This manifestly makes a very strong and durable connection between the actuating lever and the cable.

In practice, the signal is arranged as shown relatively to a wind-shield, and the signal member 9 is normally housed in the casing so as to be effectively protected from the weather. When, however, it is desirable for the driver to signal to an automobile at his rear, it is simply necessary for the driver to manipulate the actuating lever, when the signal member will be swung against the action of the spring 15 into its working position beyond the outer end of the casing. From this it follows that the spring 15, according to its tension, may be utilized to assist in the return of the signal member to the idle position in the casing, or the said spring may be wholly depended upon to bring about the housing of the signal member in the casing when the actuating lever is released.

By reason of the relative arrangement described, it will be observed that ample leverage is afforded for the operation of the signal member, and that a short swinging movement of the actuating lever is sufficient to move the signal member 9 to the working position thereof.

This is due in a large measure to the fact that when the lever 18× is swung on its center of movement, the cable 13 will be taken up on the circular portion 20 or let off of said circular portion 20 according to the direction of movement of the lever.

Having described our invention, what we claim and desire to secure by Letters-Patent, is:

An automobile signal comprising a casing body, a tubular body connected with and extending endwise from the casing body and adapted to be affixed to an automobile portion, a flattened casing at the inner end of said tubular body, an actuating lever pivoted in said flattened casing and having spaced disk-like circular portions and also having an intermediate portion of less diameter than the disk-like portions between said portions, a signal member pivotally mounted in and movable out of and into the casing body, a pulley fixed with respect to and arranged alongside the signal member, a cable connected to said pulley and adapted to be taken up on the same, said cable being extended through the inner end wall of the casing and the tubular body and looped about the intermediate portion of the actuating lever and connected to said lever at a point outwardly beyond the disk-like portions thereof, and a retractile spring connected at one end to the casing and having at its opposite end a terminal portion that is connected to and adapted to be taken up on the pulley.

In testimony whereof we affix our signatures.

LEROY AYRES BIGGAR.
RUTHERFORD HAYES BIGGAR.